(12) United States Patent
Izume

(10) Patent No.: US 9,086,137 B2
(45) Date of Patent: Jul. 21, 2015

(54) PLATE CYLINDER DRIVE UNIT IN PRINTER

(75) Inventor: Masayuki Izume, Kyoto (JP)

(73) Assignees: I. MER CO., LTD., Kyoto-shi (JP);
Nippon National Seikan Company, Ltd., Ishioka-shi (JP)

( * ) Notice: Subject to any disclaimer, the term of this patent is extended or adjusted under 35 U.S.C. 154(b) by 153 days.

(21) Appl. No.: 14/005,626

(22) PCT Filed: Feb. 15, 2011

(86) PCT No.: PCT/JP2011/053143
§ 371 (c)(1),
(2), (4) Date: Jan. 22, 2014

(87) PCT Pub. No.: WO2012/111091
PCT Pub. Date: Aug. 23, 2012

(65) Prior Publication Data
US 2014/0123795 A1    May 8, 2014

(51) Int. Cl.
*B41F 13/14* (2006.01)
*F16H 55/18* (2006.01)
*B41F 13/12* (2006.01)
*B41F 13/08* (2006.01)
*B41F 13/008* (2006.01)

(52) U.S. Cl.
CPC ............... *F16H 55/18* (2013.01); *B41F 13/12* (2013.01); *B41F 13/14* (2013.01); *B41F 13/008* (2013.01); *B41F 13/08* (2013.01); *Y10T 74/19623* (2015.01)

(58) Field of Classification Search
CPC ...................................................... B41F 13/14
See application file for complete search history.

(56) References Cited

U.S. PATENT DOCUMENTS

| | | | | |
|---|---|---|---|---|
| 2,030,028 A | * | 2/1936 | Greenwood | 74/395 |
| 2,181,895 A | * | 12/1939 | Huck | 101/248 |
| 4,006,685 A | * | 2/1977 | Mosemiller | 101/248 |
| 4,137,845 A | * | 2/1979 | Jeschke | 101/248 |
| 5,535,675 A | | 7/1996 | Gentle | |
| 5,813,335 A | * | 9/1998 | Burke et al. | 101/217 |
| 2007/0012207 A1 | | 1/2007 | Takenouchi et al. | |

FOREIGN PATENT DOCUMENTS

| | | | |
|---|---|---|---|
| JP | 06-126927 A | 5/1994 |
| JP | 08-300606 A | 11/1996 |
| JP | 09-039196 A | 2/1997 |
| JP | 10-309792 A | 11/1998 |
| JP | 2002-188708 A | 7/2002 |
| JP | 2007-021858 A | 2/2007 |

OTHER PUBLICATIONS

International Search Report dated Apr. 12, 2011, issued for PCT/JP2011/053143.

* cited by examiner

*Primary Examiner* — Jill Culler
(74) *Attorney, Agent, or Firm* — Locke Lord LLP

(57) ABSTRACT

The present invention eliminates backlash between a drive helical gear and a driven helical gear and facilitates rotation of a driven gear member to increase rotational accuracy of a plate cylinder. A plate cylinder drive unit includes a plate cylinder drive shaft, a driven gear member having a driven helical gear that meshes with a drive helical gear and attached around the plate cylinder drive shaft, a position adjustment member moving the driven gear member to fix it at a predetermined position, a whirl-stop member attached to the plate cylinder drive shaft, a sandwiching member removably fixing the whirl-stop member to the driven gear member, a backlash eliminating helical gear disposed on one side of the driven helical gear, first springs bringing the backlash eliminating helical gear in pressure-contact with the driven helical gear, and second springs biasing the backlash eliminating helical gear to rotate it in a predetermined direction.

10 Claims, 6 Drawing Sheets

PLATE CYLINDER DRIVE UNIT IN PRINTER

TECHNICAL FIELD

The present invention relates to a plate cylinder drive unit in a printer.

BACKGROUND ART

There is known a printer that performs multi-color printing on an outer circumference surface of beverage cans including beer cans in which a drive gear is designed to drive a plurality of plate cylinders corresponding to each of the colors.

In the above-mentioned printer, plate cylinder drive units that transmit rotation of the drive gear to the plate cylinders are provided for respective plate cylinders. Each of the plate cylinder drive units includes a plate cylinder drive shaft rotatably supported on a frame of the printer and rotating with the plate cylinder, and a driven gear member fixed to the plate cylinder drive shaft. The driven gear member includes a driven gear that meshes with the drive gear. In multi-color printers, relative position in the rotational direction (rotational phase) between the plate cylinder drive shaft and the driven gear member is required to be adjusted for register. For fine register, the printer is designed such that the drive gear and the driven gears are helical gears and that the driven gear member is axially moved with respect to the plate cylinder drive shaft to allow axial movement of the driven gear with respect to the drive gear. Further, for rough register, the printer is designed such that the driven gear member is rotatable with respect to the plate cylinder drive shaft and that, during printing, the driven gear member is fixed to the plate cylinder drive shaft and to be nonrotatable relative to the plate cylinder drive shaft by a suitable whirl-stop means.

In printers, eliminating backlash between the drive gear and the driven gear is important to increase rotational accuracy of the plate cylinder and perform high quality printing.

As a structure to eliminate the backlash of the helical gear, there is known a printer in which a backlash eliminating helical gear, as a second driven gear, is used, with the second driven gear being stacked with the first driven gear. One typical example is a structure that a plurality of guide bars each of which is fixed to one side of the first driven gear support the second driven gear in an axially movable manner, and a spring biases the second driven gear toward the first driven gear to bring the teeth of both driven gears in pressure contact with those of the drive gear. At this time, to reliably bring the teeth of the both driven gears in pressure contact with those of the drive gear, clearance is formed between the both driven gears in an axial direction. Because the teeth of the helical gear are provided at an angle, not only reaction force in the circumferential direction but also that in the axial direction is generated at the meshing portion. The drive gear meshes with the driven gear only at one location in the circumferential direction. Therefore, when the second gear starts tilting and keeps rotating in the tilted state, rotation of the driven gear member fails to rotate smoothly and rotational accuracy of the plate cylinder is reduced, resulting in deteriorated printing quality.

SUMMARY OF THE INVENTION

Problems to be Solved by the Invention

An object of the present invention is to solve the above-mentioned problems and to provide a plate cylinder drive unit in a printer in which backlash between the drive helical gear and the driven helical gear is eliminated and rotation of the driven gear member is facilitated to increase rotational accuracy of a plate cylinder.

Means for Solving the Problems

A plate cylinder drive unit according to the present invention is a plate cylinder drive unit in a printer which rotatably drives a plate cylinder by transmitting rotation of a drive helical gear to a plate cylinder, the plate cylinder drive unit comprising: a plate cylinder drive shaft rotatably supported on a frame of the printer and connected to the plate cylinder to rotate integrally with the plate cylinder; a driven gear member having a driven helical gear that meshes with the drive helical gear and attached around the plate cylinder drive shaft in such a manner that the driven gear member is rotatable and axially movable with respect to the plate cylinder drive shaft; register means for axially moving the driven gear member with respect to the plate cylinder drive shaft and fixing the driven gear member at a predetermined position; a whirl-stop member attached to the plate cylinder drive shaft in such a manner that the whirl-stop member is nonrotatable but axially movable with respect to the plate cylinder drive shaft; whirl-stop-member fixation means for removably fixing the whirl-stop member to the driven gear member; a backlash eliminating helical gear disposed on one side of the driven helical gear in such a manner that the backlash eliminating helical gear is rotatable and axially movable within a predetermined range with respect to the driven helical gear; a first elastic member biasing the backlash eliminating helical gear toward the driven helical gear to bring the backlash eliminating helical gear in pressure contact with the one side of the driven helical gear; and a second elastic member biasing the backlash eliminating helical gear in such a manner that the backlash eliminating helical gear rotates in a predetermined direction with respect to the driven helical gear.

In a state in which the whirl-stop member is not fixed to the driven gear member, the driven gear member and the plate cylinder drive shaft are rotatable relative to each other, which allows rotational position adjustment of the driven gear member and the plate cylinder drive shaft for register.

During printing, the whirl-stop member is fixed to the driven gear member. In this state, the plate cylinder drive shaft rotates integrally with the driven gear member.

In a state in which the whirl-stop member is thus fixed to the driven gear member, the register means enables axial movement of the driven gear member with respect to the plate cylinder drive shaft. This axial movement of the driven gear member results in axial movement of the driven helical gear of the driven gear member with respect to the drive helical gear, and helix angle of the both helical gears causes the driven helical gear to rotate with respect to the drive helical gear, whereby rotational phase of the both helical gears changes. This allows fine register.

In the state in which the whirl-stop member is fixed to the driven gear member as mentioned above, rotation of the drive helical gear is transmitted via the driven helical gear to the driven gear member and the plate cylinder drive shaft, whereby the plate cylinder rotates. At this time, because the second elastic member biases the backlash eliminating helical gear such that the backlash eliminating helical gear rotates in a predetermined direction with respect to the driven helical gear, no backlash is formed between the drive helical gear and the driven helical gear. Further, because the first elastic member biases the backlash eliminating helical gear toward the driven helical gear to bring the backlash eliminating helical gear in pressure contact with one side of the driven helical gear, the backlash eliminating helical gear does not tilt. Therefore, rotation of the driven gear member is facilitated and rotational accuracy of the plate cylinder is high, which results in improved printing quality.

In the plate cylinder drive unit of the present invention, for example, the whirl-stop-member fixation means comprises a sandwiching member sandwiching the whirl-stop member between the whirl-stop-member fixation means and the driven gear member, and a screw member fixing the sandwiching member to the driven gear member to sandwich the whirl-stop member between the sandwiching member and the driven gear member, the sandwiching member comprises a cylinder portion located around the whirl-stop member and a flange portion integrally formed with the cylinder portion at one end thereof and sandwiching the whirl-stop member between the driven gear member and the flange portion, and the cylinder portion of the sandwiching member is fixed to the driven gear member by means of the screw member.

In this case, loosening the screw member allows the whirl-stop member to rotate with respect to the driven gear member, which therefore allows rotation of the plate cylinder drive shaft with respect to the driven gear member.

In the plate cylinder drive unit described above, for example, the whirl-stop member comprises two annular spline members stacked and fixed to each other so as to allow adjustment of relative positions of the spline members in a circumferential direction, and each spline member has, on an inner circumference thereof, spline teeth that fit into spline grooves formed on an outer circumference of the plate cylinder drive shaft.

In this case, adjusting the circumferential positions of the two spline members eliminates backlash between the whirl-stop member and the plate cylinder drive shaft, whereby printing quality is improved.

In the plate cylinder drive unit described above, for example, a first spline member has a plurality of screw holes into which a plurality of screw members are screwed, a second spline member has a plurality of screw penetrating holes whose inner diameter is greater than an outer diameter of an external thread portion of the screw member, and the screw members are inserted through the corresponding screw penetrating holes and screwed into the corresponding screw holes, respectively, to fix the two spline members to each other.

In this case, loosening the screw members allows position adjustment of the two spline members in the circumferential direction, and tightening the screw members allows fixation of the two spline members at an adjusted position whereby backlash between the whirl-stop member and the plate cylinder drive shaft is eliminated.

In the plate cylinder drive unit described above, for example, the second spline member has a position adjustment circular hole which penetrates the second spline member in an axial direction, and the first spline member has, on a surface thereof facing the circular hole, a position adjustment elongated hole whose circumferential width is smaller than an inner diameter of the circular hole and whose radial length is greater than the circumferential width of the elongated hole.

In this case, for example, with use of an eccentric shaft member that includes a control shaft portion and an eccentric shaft portion having a diameter smaller than that of the control shaft portion and eccentrically and integrally formed on one end surface of the control shaft portion, circumferential position adjustment and fixation of the two spline members are readily accomplished as described below. First, with screw members the two spline members are loosely connected, and both spline members are fitted around the plate cylinder drive shaft such that spline teeth are fitted into the spline grooves of the plate cylinder drive shaft. Next, the eccentric shaft portion of the eccentric shaft member is passed through the position adjustment circular hole of the second spline member and is fitted into the position adjustment elongated hole of the first spline member to rotate the control shaft portion. Then, the eccentric shaft portion moves arcuately around the central axis of the control shaft portion whereby the two spline members circumferentially move relative to each other. In this state, the circumferential positions of the two spline members are adjustable. The screw member is tightened in such a state to fix the spline members to each other.

In the plate cylinder drive unit described above, for example, a screw member for fixing the two spline members of the whirl-stop member is a hexagon socket head bolt, and the flange portion of the sandwiching member includes at least one position adjustment circular hole, as a through hole, which corresponds to the position adjustment circular hole of the second spline member, and a plurality of bolt tightening circular holes, as through holes, which correspond to the plurality of screw penetrating holes of the second spline member when the position adjustment circular hole of the flange portion of the sandwiching member coincides with the position adjustment circular hole of the second spline member.

In this case, for example, with use of the above-mentioned eccentric shaft member and a hexagon wrench, circumferential position adjustment and fixation of the two spline members are readily accomplished as described below. First, the driven gear member, two spline members loosely connected with the hexagon socket head bolt, and the sandwiching member are fitted around the plate cylinder drive shaft and the sandwiching member is loosely connected to the driven gear member with a screw member such that the plate cylinder drive shaft and the whirl-stop member fixed to the plate cylinder drive shaft are rotatable with respect to the driven gear member and the sandwiching member fixed to the driven gear member. Then, the whirl-stop member and the sandwiching member are rotated with respect to each other such that the position adjustment circular hole of the flange portion of the sandwiching member coincides with the position adjustment circular hole of the second spline member. Next, the above-mentioned eccentric shaft portion of the eccentric shaft member is passed through the position adjustment circular hole of the sandwiching member and the position adjustment circular hole of the second spline member to fit the eccentric shaft portion into the position adjustment elongated hole of the first spline member. Then, in the same manner as described above, the eccentric shaft member is rotated to adjust the circumferential positions of the two spline members. At this time, because the bolt tightening circular hole of the flange portion of the sandwiching member coincides with the bolt passed through the screw member insertion hole of the second spline member, the hexagon wrench is passed through the bolt tightening circular hole of the sandwiching member to fit the hexagon wrench into the head of the bolt to tighten the bolt, whereby both spline members are fixed to each other. As described above, circumferential position adjustment and fixation of the two spline members are accomplished in a state in which the sandwiching member is loosely connected to the driven gear member with the screw member. Therefore, for the adjustment and fixation of the spline members there is no need to completely remove the sandwiching member from the driven gear member.

Effect of the Invention

According to the plate cylinder drive unit of the present invention, as described above, backlash between the drive helical gear and the driven helical gear is eliminated and rotation of the driven gear member is facilitated whereby rotational accuracy of the plate cylinder are increased. As a result, printing quality is improved.

MODES FOR CARRYING OUT THE INVENTION

Embodiments which are applied to a printer that performs multi-color printing on an outer circumference surface of beverage cans will next be described with reference to the drawings.

Figure 1:
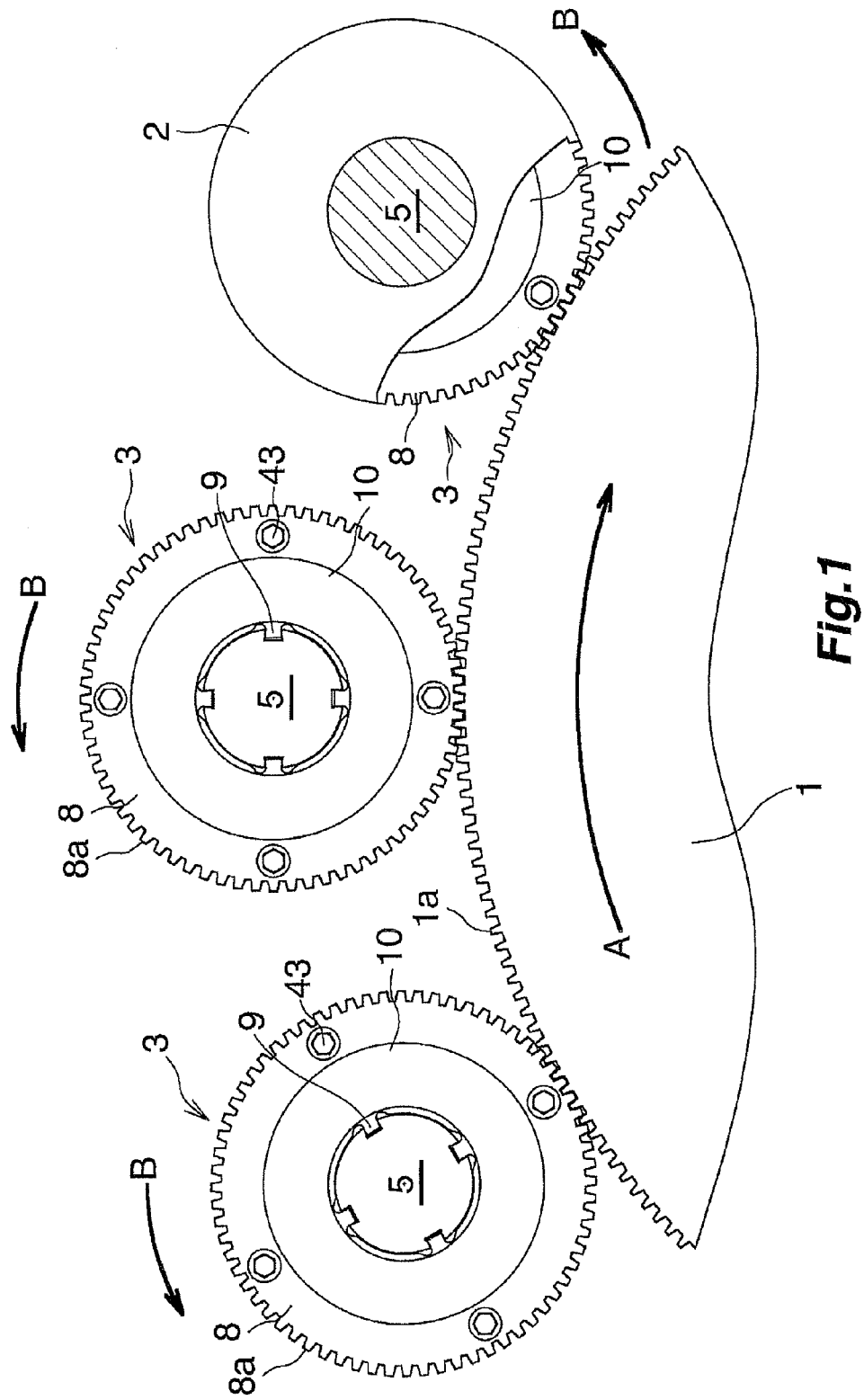
FIG. 1 is a partial cut away front view of a main portion of a printer showing an embodiment of the present invention.
Figure 2:
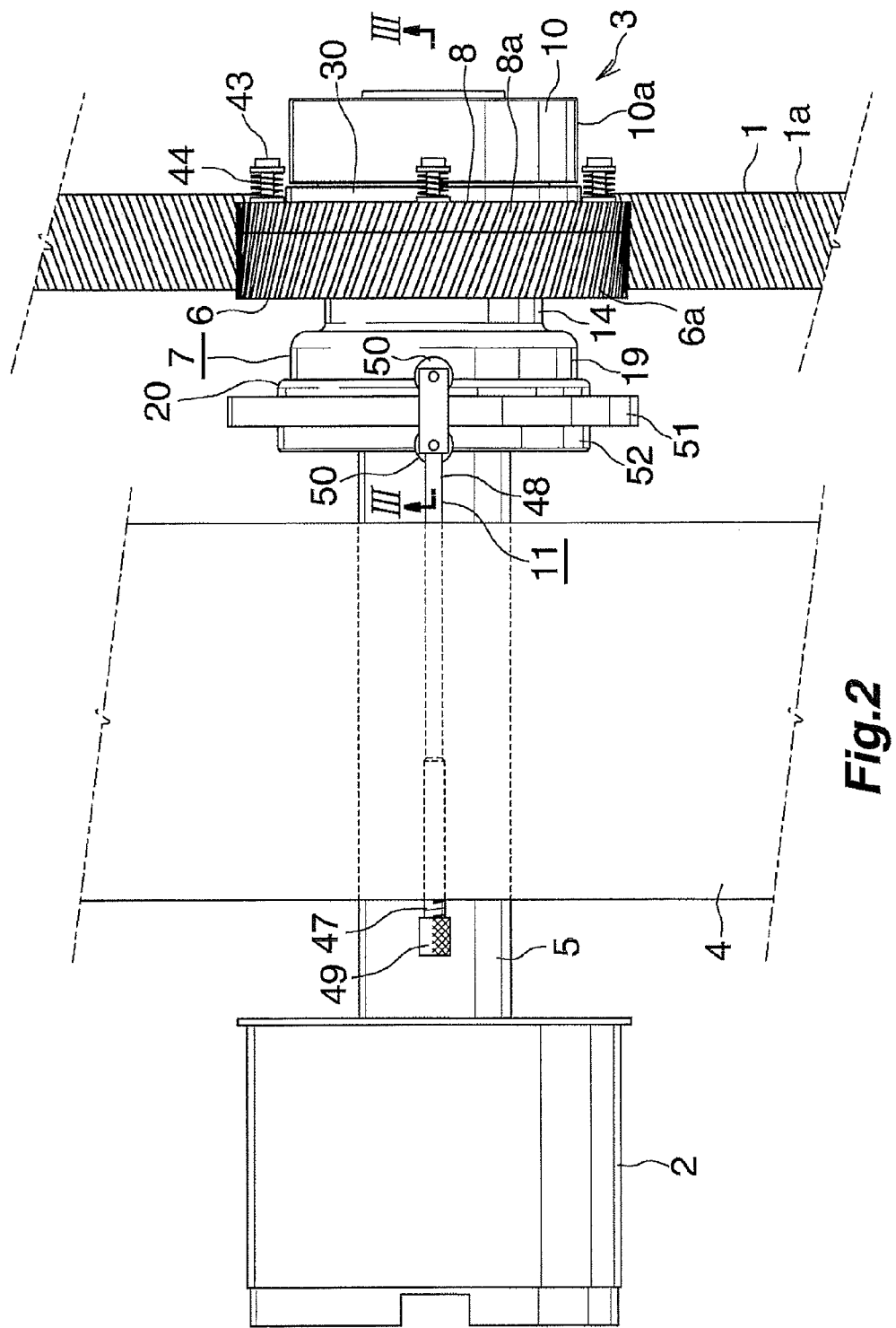
FIG. 2 is a plan view of FIG. 1.

FIG. 1 is a partial cut away front view showing a main portion of the printer. FIG. 2 is a plan view showing the main portion of the printer. In FIGS. 1 and 2, some components are not illustrated.

In the following description, the right-hand side of FIG. 2 (the near side of the paper bearing FIG. 1) will be referred to as "front," and the left-hand side of FIG. 2 (the far side of the paper bearing FIG. 1) as "rear," respectively. The rotational direction of each component will be referred to a direction as viewed from the front shown in FIG. 1.

As shown in FIGS. 1 and 2, in the printer of the present invention, a plurality of plate cylinders 2 are driven by one drive helical gear 1, which is a main gear. In the following description, the drive helical gear 1 will be referred to as a "first gear." Around the first gear 1, a plurality of plate cylinder drive units 3 are disposed. Although not described in detail, the first gear 1 is rotatably supported on a frame 4 of the printer and is rotatably driven around a horizontal axis by use of an unillustrated suitable drive means. In this example, the rotational direction of the first gear 1 is clockwise as indicated by an arrow A in FIG. 1 and FIG. 4 as will hereinafter be described. On an outer circumference of the first gear 1, a plurality of teeth 1a are formed at a predetermined helix angle.

FIGS. 3 to 6 show details of the plate cylinder drive unit 3.

Figure 3:
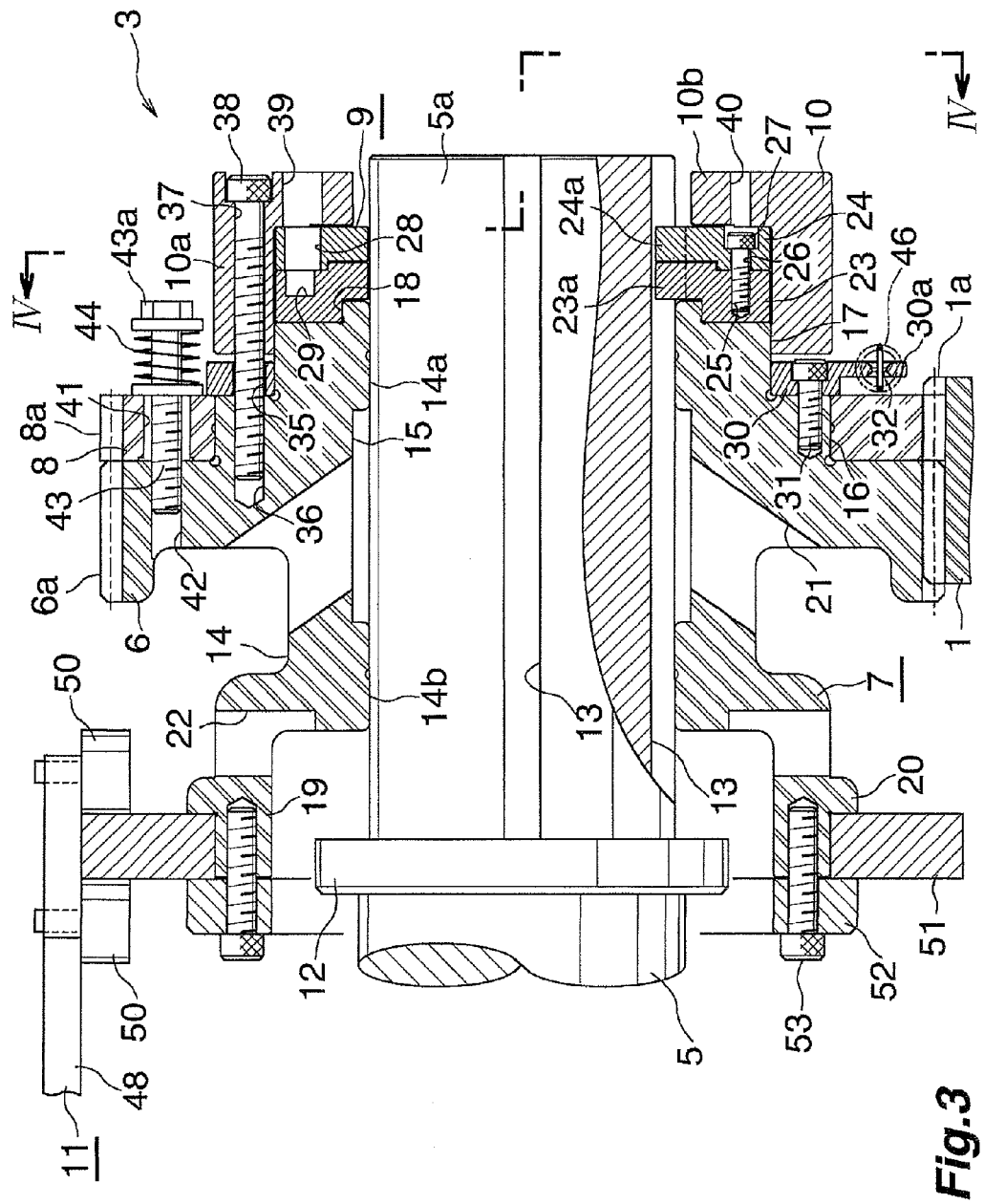
FIG. 3 is an enlarged sectional view taken along line of FIG. 2.

As shown in FIG. 3, the plate cylinder drive unit 3 includes a plate cylinder drive shaft 5, a driven gear member 7 having a driven helical gear 6, a backlash eliminating helical gear 8, a whirl-stop member 9, a sandwiching member 10 constituting a whirl-stop-member fixation means, and a position adjustment member 11 constituting a register means. In the following description, the driven helical gear 6 is called a second gear, the backlash eliminating helical gear 8 a third gear.

As shown in FIG. 2, the plate cylinder drive shaft 5 is rotatably supported on the frame 4 to be parallel to the central axis of the first gear 1. The plate cylinder 2 is connected to the rear end portion of the drive shaft 5 projecting rearward from the frame 4 and rotates integrally with the drive shaft 5.

Figure 4:
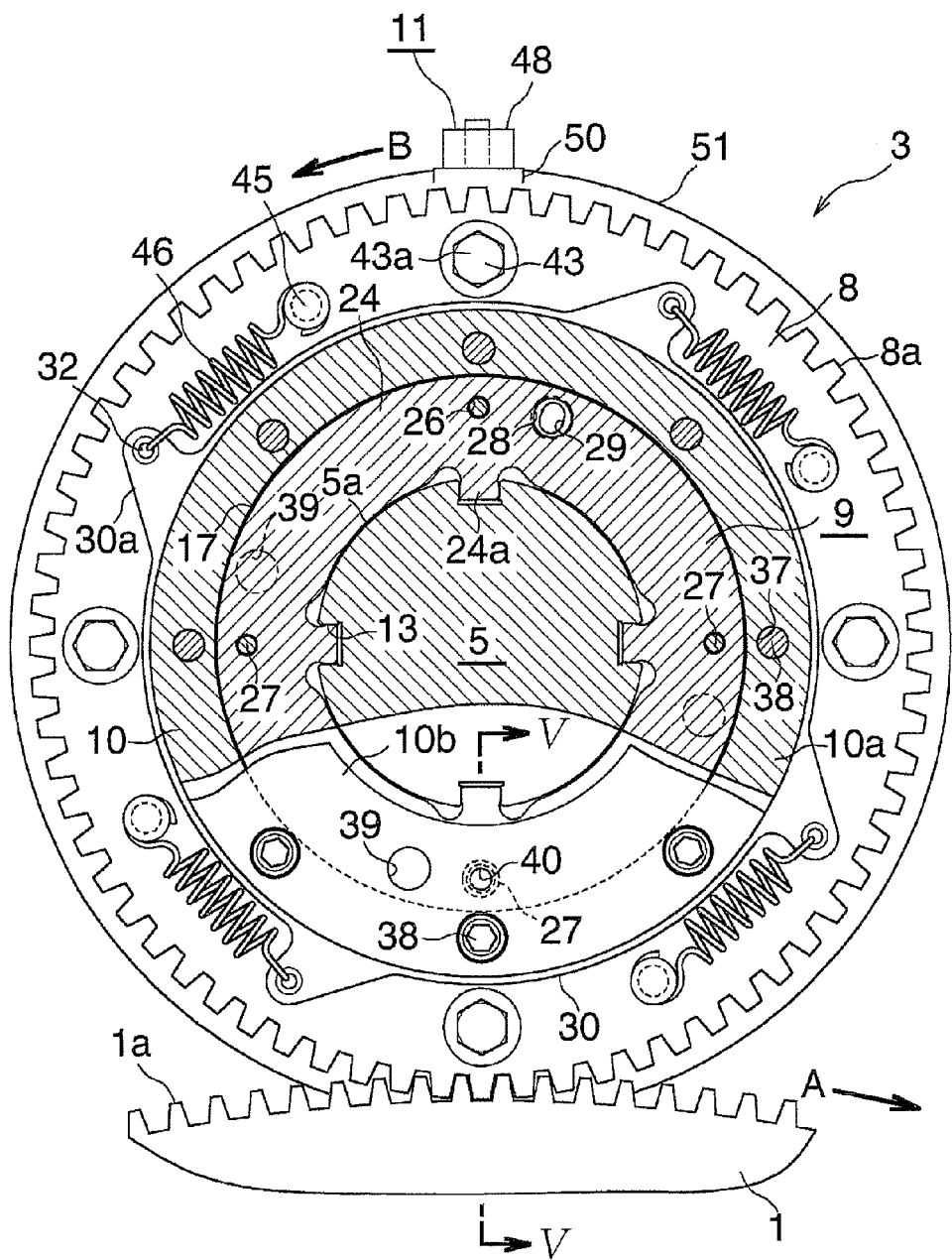
FIG. 4 is a sectional view taken along line IV-IV of FIG. 3.
Figure 5:
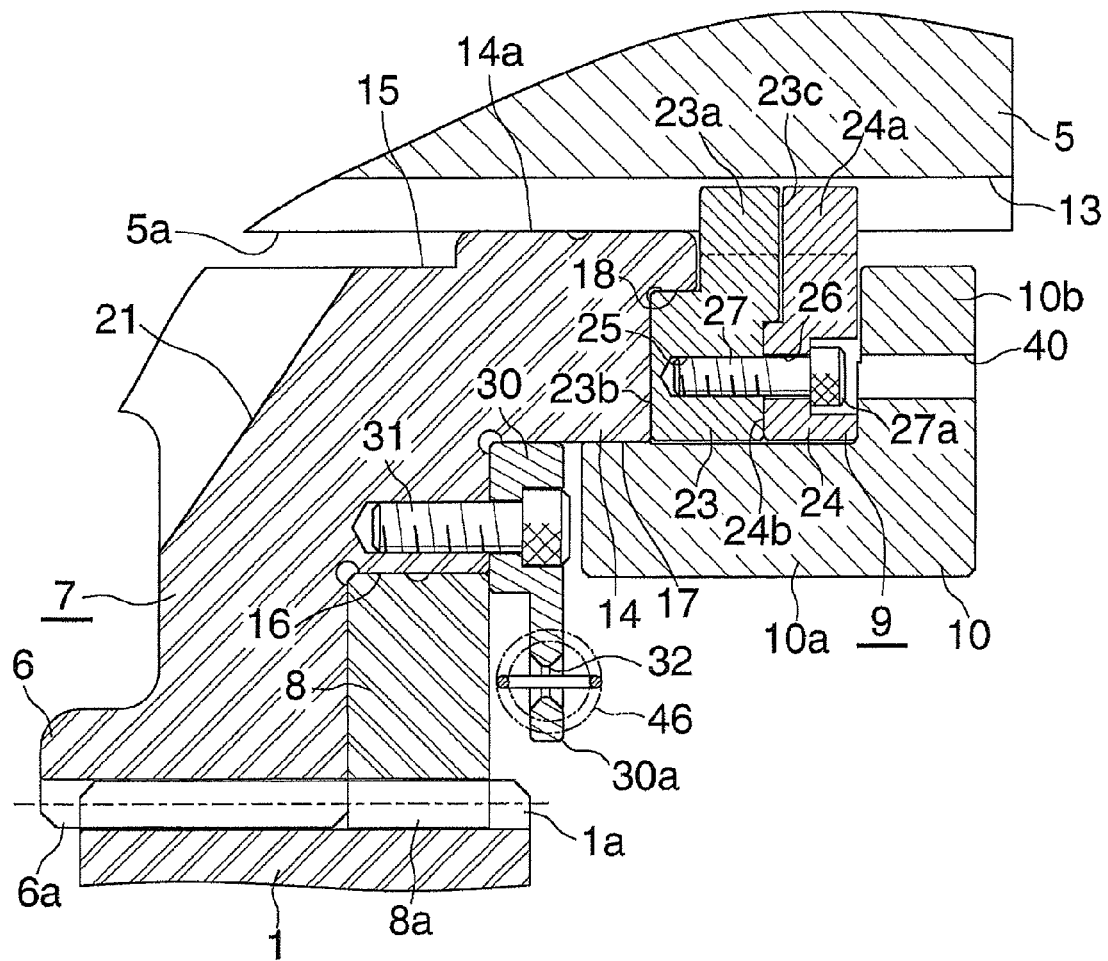
FIG. 5 is an enlarged sectional view taken along line V-V of FIG. 4.
Figure 6:
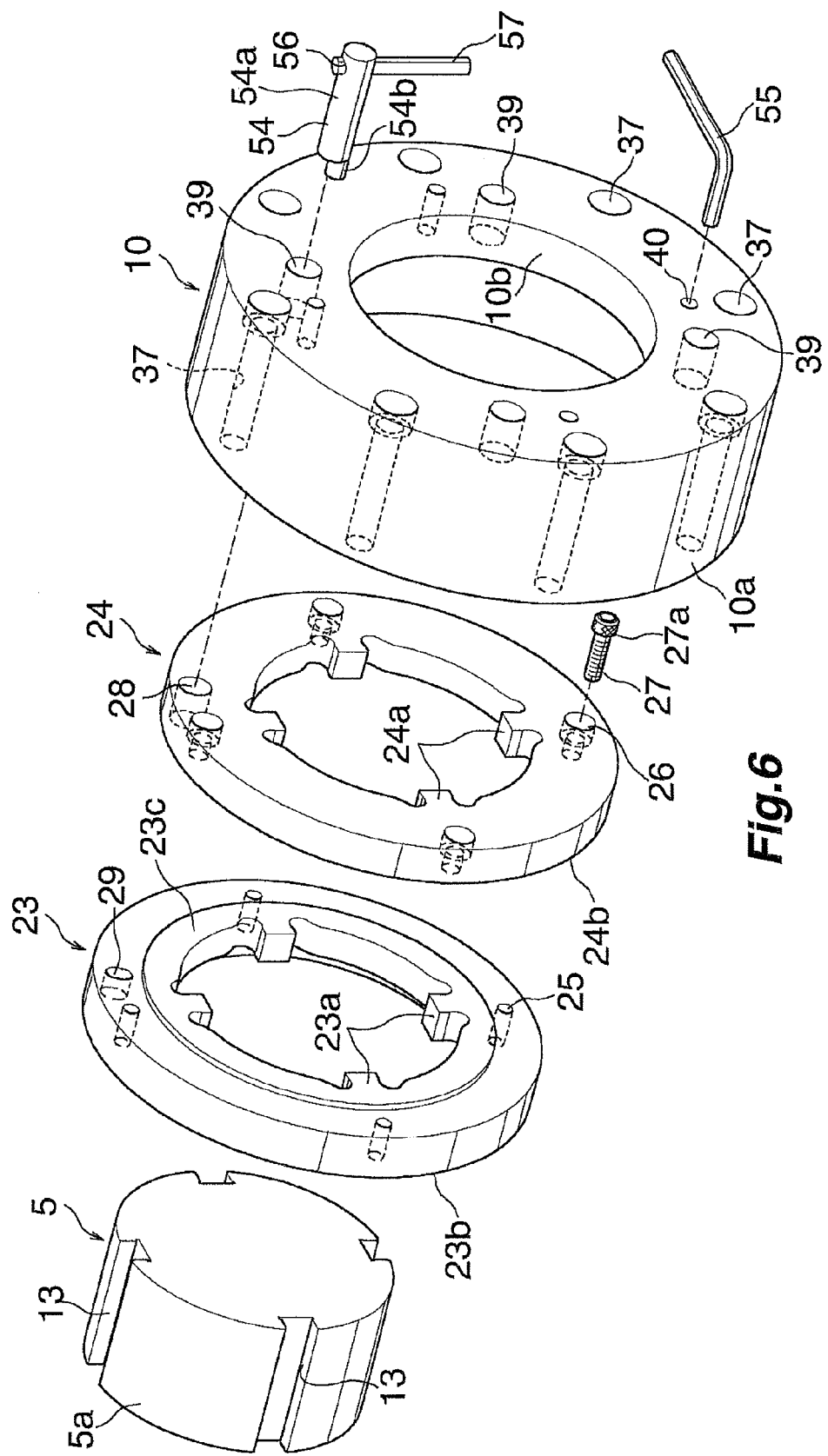
FIG. 6 is an exploded perspective view of a main portion of the plate cylinder drive unit.

FIG. 3 is a vertical cross-sectional view showing an overall configuration of the plate cylinder drive unit 3 (an enlarged sectional view taken along line of FIG. 2). FIG. 4 is a partial cut away front view of the plate cylinder drive unit 3 (a sectional view taken along line IV-IV of FIG. 3). FIG. 5 is a vertical cross-sectional view showing, on an enlarged scale, a front portion of the plate cylinder drive unit 3 (an enlarged sectional view taken along line V-V of FIG. 4) FIG. 6 is an exploded perspective view showing a front portion of the plate cylinder drive shaft 5, the whirl-stop member 9, and the sandwiching member 10.

As shown in FIG. 3, an outward flange 12 is formed integrally at a portion near the front end of the drive shaft 5, and a portion of the drive shaft 5 located frontward of the flange 12 and having a uniform outer diameter serves as a connecting shaft portion 5a connected to the driven gear member 7. At a plurality of (in this example, four) locations on the outer circumference of the connecting shaft portion 5a, where the outer circumference is equally divided, rectangular spline grooves 13 extending in the front-rear direction are formed. Each of the spline grooves 13 extends over the entire length of the connecting shaft portion 5a.

The gear member 7 is attached around the connecting shaft portion 5a such that the gear member 7 is rotatable and axially movable with respect to the connecting shaft portion 5a.

The gear member 7 includes a boss 14 fitted around the drive shaft 5. On an inner circumference of the boss 14 an annular groove 15 is formed, and inner circumferential surfaces of front and rear sliding contact portions 14a, 14b located frontward and rearward of the groove 15 slidably contact with an outer circumferential surface of the connecting shaft portion 5a.

The second gear 6 is integrally formed on an outer circumference of an axially intermediate portion of the boss 14. A portion of the boss 14 which is located frontward of the second gear 6 serves as a first mating portion 16 having an outer diameter smaller than that of the second gear 6. The third gear 8 is fitted around the first mating portion 16 in a rotatable and axially movable manner. On outer circumferences of the second gear 6 and the third gear 8, a plurality of teeth 6a, 8a meshing with the teeth 1a of the first gear 1 are respectively formed at an angle with each of the teeth 6a, 8a having a predetermined helix angle. The second gear 6 and the third gear 8 are rotated counterclockwise by the first gear 1 as indicated by arrows B in FIG. 1 and FIG. 4. Details of the third gear 8 will be described later.

A portion of the boss 14 which is located frontward of the first mating portion 16 serves as a second mating portion 17 having an outer diameter smaller than that of the first mating portion 16. A front end portion of the boss 14, which is located frontward of the second mating portion 17, serves as the third mating portion 18 having an outer diameter smaller than that of the second mating portion 17. On an outer circumference at a rear end of the boss 14, a cylindrical connection portion 19 extending rearward is integrally formed. The connection portion 19 is concentric with the boss 14, and the inner diameter of the connection portion 19 is greater than the outer diameter of the drive shaft 5. On an outer circumference of the connection portion 19, an outward flange 20 is integrally formed. In the boss 14 immediately rearward of the second gear a plurality of first oil filler holes 21 are formed at equal intervals in the circumferential direction. Each first oil filler hole 21 axially penetrates through the boss 14 and communicates with the annular groove 15. Each first oil filler hole 21 is inclined rearward toward radially outside. At a portion of the connection portion 19 which is located frontward of the flange 20, a plurality of second oil filler holes 22 are formed at equal intervals in the circumferential direction. Each second oil filler hole 22 axially penetrates through the connection portion 19 and reaches an inside of the connection portion 19 immediately rearward of the boss 14.

As shown in detail in FIGS. 5 and 6, the whirl-stop member 9 includes two spline members 23 and 24 which are stacked for adjustment of the circumferential relative positions and fixed to each other. The rear spline member 23 will be referred to as a first spline member, the front spline member 24 a second spline member. Each of the spline members 23 and 24 assumes an annular shape which is relatively thick in an axial direction. The inner diameter of each of the spline members 23 and 24 is slightly greater than the outer diameter of the connecting shaft portion 5a of the drive shaft 5. On inner circumferences of the spline members 23 and 24, the same number of rectangular spline teeth 23a and 24a as the spline grooves 13 of the drive shaft 5 are integrally formed at equal intervals in the circumferential direction, respectively. At a portion of the first spline member 23 on a rear end surface and an outer circumferential side thereof, an annular first mating portion 23b projecting rearward is integrally formed. At a portion of the first spline member 23 on a front end surface and an inner circumferential side thereof, an annular second mating portion 23c projecting frontward is integrally formed. At a portion of the second spline member 24 on a rear end surface and an outer circumferential side thereof, an annular mating portion 24b projecting rearward is integrally formed. At a portion of the first spline member 23 located toward the outer circumference thereof, a plurality of (in this example, four) screw holes 25 extending axially are formed at equal intervals in the circumferential direction. At a portion of the second spline member 24 located toward the outer circumference thereof, a plurality of bolt holes 26 each having a counter bore, which are screw member insertion holes corresponding to the screw holes 25 of the first spline member 23, are formed in a penetrating manner. The mating portion 24b of the second spline member 24 is stacked with the outside portion of the second mating portion 23c of the first spline member 23 such that the mating portion 24b comes into close contact with the outside portion of the second mating portion 23c, and the spline members 23 and 24 are fixed to each other by use of hexagon socket head bolts (first bolts) (27), which are screw members passed through the bolt holes 26 and screwed into the screw holes 25. A head 27a of the first bolt 27 completely sinks inward under the bolt hole 26 in a state in which the first bolt 27 passed through the bolt hole 26 of the second spline member 24 is loosely fitted into the screw hole 25 of the first spline member 23 and both spline members 23 and 24 are proximately positioned relative to each other. In a state where the spline members 23 and 24 are thus fixed, the circumferential position of the spline teeth 23a of the spline members 23 approximately coincides with that of the spline teeth 24a of the spline member 24. The spline members 23 and 24 are fitted around the connecting shaft portion 5a such that the spline teeth 23a and 24a are fitted into the spline groove 13, and the first mating portion 23b of the first spline member 23 is fitted around the third mating portion 18 of the boss 14.

The inner diameter of the bolt hole 26 of the second spline member 24 is slightly greater than the outer diameter of the first bolt 27 (the outer diameter of the external thread portion). Therefore, the spline members 23 and 24 are rotatable with respect to each other to some extent in a state in which the spline members 23 and 24 are proximately positioned with the first bolt 27 passed through the bolt hole 26 of the second spline member 24 being loosely fitted into the screw hole 25 of the first spline member 23. By adjusting the circumferential relative position between the two spline members 23 and 24, the spline teeth 23a and 24a of the spline members 23 and 24 are brought in pressure contact with opposite side walls of the spline groove 13. In such a state, the first bolts 27 are tightened, whereby the spline members 23 and 24 are fixed. The pressure-contacting force of the spline teeth 23a and 24a with the opposite side walls of the spline groove 13 is such that there is no backlash between the spline groove 13 and the spline teeth 23a and 24a but the spline teeth 23a and 24a are axially movable within the spline grooves 13. At one location of the second spline member 24 which is circumferentially deviated from one of the bolt holes 26, a position adjustment circular hole 28 is formed in a penetrating manner. In a state in which the spline members 23 and 24 are fixed as described above, on an front end surface of the first spline member 23 corresponding to the circular hole 28, a position adjustment elongated hole 29, which is long in the radial direction, is formed. The circumferential width of the elongated hole 29 is smaller than the inner diameter of the circular hole 28.

An annular spring support member 30 is fitted around the rear portion of the second mating portion 17 of the boss 14 of the gear member 7 and, by use of a plurality of bolts (second bolts) 31, is fixed to a forward-facing annular end surface of the boss 14 which is located at a rear side of second mating portion 17. On the outer circumference of the spring support member 30, a plurality of (in this example, four) convexities 30a are integrally formed at equal intervals in the circumferential direction. Each convexity 30a extends obliquely such that the convexity 30a faces radially outward and clockwise. At a portion toward the distal end of each convexity 30a, a spring support hole 32 is formed. The outer diameter of the spring support member 30 is slightly greater than that of the first mating portion 16 of the boss 14, and the inner circumferential portion of the third gear 8 is fitted between the spring support member 30 and the second gear 6. At locations different from those of the second bolts 31 of the spring support member 30, a plurality of (in this example, eight) bolt holes 35, which are screw member insertion holes, are formed at equal intervals in the circumferential direction in a penetrating manner. On an annular end surface of the boss 14 corresponding to these bolt holes 35, a plurality of screw holes (first screw holes) 36 are formed.

The sandwiching member 10 is integrally provided with an inward flange (flange portion) 10b at a front end of the cylinder portion 10a having a relatively large thickness. A rear portion of the cylinder portion 10a of the sandwiching member 10 is fitted around the second mating portion 17 of the boss 14 located frontward of the spring support member 30, the whirl-stop member 9 is positioned inside of the cylinder portion 10a, and the whirl-stop member 9 is sandwiched between the flange 10b and a forward-facing annular end surface of the boss 14 which is located at a rear side of the third mating portion 18. In the cylinder portion 10a of the sandwiching member 10, eight bolt holes 37 having counter bores, which are screw penetrating holes corresponding to eight bolt holes 35 of the spring support member 30, are formed in a penetrating manner. The whirl-stop member 9 is sandwiched and fixed between the flange 10b and the forward-facing annular end surface of the boss 14 which is located at a rear side of the third mating portion 18 by use of a plurality of hexagon socket head bolts (third bolts) 38, which are screw members inserted into the bolt holes 37 of the sandwiching member 10 and the bolt holes 35 of the spring support member 30 and screwed into the internal threads 36 of the boss 14. In this state, the gear member 7 is rotatable integrally with the drive shaft 5. The third bolts 38 along with the sandwiching member 10 constitute the whirl-stop-member fixation means.

In the flange 10b of the sandwiching member 10, at least one position adjustment circular hole 39 is formed in a penetrating manner. In this example, four circular holes 39 are formed. The diameter of a circle passing through the center of each of these circular holes is equal to that of a circle passing through the center of the position adjustment circular hole 28 of the second spline member 24. The diameter of the circular hole 39 of the sandwiching member 10 is slightly greater than that of the circular hole 28 of the second spline member 24. In the flange 10b of the sandwiching member 10, bolt tightening circular holes 40, which is equal in number to the bolt holes 26 of the second spline member 24, are also formed in a penetrating manner. The diameter of a circle passing through the center of each of these circular holes 40 is equal to that of a circle passing through the center of the bolt hole of the second spline member 24. The circumferential positional relationship between the two kinds of the circular holes 39 and 40 of the flange 10b is the same as that between the bolt hole 26 and the position adjustment circular hole 28 of the second spline member 24, and any one of the position adjustment circular holes 39 of the sandwiching member 10 coincides with the position adjustment circular hole 28 of the second spline member 24 when the bolt tightening circular hole 40 of the sandwiching member 10 coincides with the bolt hole 26 of the second spline member 24.

In the third gear 8, a plurality of (in this case, four) bolt holes 41, which are screw member insertion holes, are formed at equal intervals in the circumferential direction in a penetrating manner. In the second gear 6, a plurality of screw holes (second screw holes) 42 corresponding to these bolt holes 41 are formed. A plurality of guide bolts 43 are passed through the bolt holes of the third gear 8, and the rear portion of each of the guide bolts 43 is screwed into the screw hole 42 of the second gear 6. These bolts 43 are projecting frontward from the third gear 8. The inner diameter of the bolt hole 41 is slightly greater than the outer diameter of the bolt 43, and the third gear 8 is rotatable with respect to the second gear 6 by a predetermined amount. Around the bolt 43 between a head 43a at an front end of the bolt 43 and the third gear 8, a compression coil spring (first spring) 44 is mounted, the first spring 44 being a first elastic member biasing the third gear 8 rearward and bring the third gear 8 into pressure contact with the second gear 6. A plurality of spring support pins 45 each projecting forward at a location clockwise away from the convexity 30a of the spring support member 30 at a predetermined distance are screwed into the third gear 8. Opposite ends of extension coil springs (second springs) 46 are fixed to the pins 45 and the holes 32 of the spring support member 30, respectively. The second spring 46 constitutes the second elastic member, which biases the third gear 8 against the second gear 6 counterclockwise (the rotational direction of the second gear 6) and eliminates backlash between the first gear 1 and the second gear 6.

As shown in FIG. 2, the position adjustment member 11 includes a screw shaft 47, a roller support shaft 48, an adjustment knob 49, and two, i.e., front and rear, rollers 50. Although not illustrated in detail, the screw shaft 47 is disposed at a rear portion of the frame 4 and engages with an unillustrated internal thread member disposed on the frame 4. The knob 49 is fixed to a rear end of the screw shaft 47 projecting rearward from the frame 4. The roller support shaft 48 is supported on the front portion of the frame 4 such that the roller support shaft 48 is nonrotatable but axially movable, and is connected to the front end portion of the screw shaft 47 such that the roller support shaft 48 is axially immovable but rotatable. The roller 50 is disposed on a lower surface of an front portion of the support shaft 48 projecting frontward from the frame 4 such that the roller 50 freely rotate around the axis of the vertical direction (the radial direction of the drive shaft 5). Rotating the adjustment knob 49 causes the roller 50 to move in the front-rear direction.

A flange member 51 in a form of a hollow disk is fitted around a portion rearward of the flange 20 of the connection portion 19 of the gear member 7. By use of a plurality of bolts 53, a fixation member 52 in a form of a hollow disk is fixed to the rear end surface of the connection portion 19, and an inner circumferential portion of the flange member 51 is sandwiched and fixed between the flange 20 and the fixation member 52. An outer circumferential portion of the flange member 51 is sandwiched between front and rear rollers 50 of the position adjustment member 11.

Assembly and position adjustment of the above-mentioned plate cylinder drive unit 3 are performed, for example, as follows.

First, the gear member 7 to which the third gear 8 is attached is fitted around the connecting shaft portion 5a, the second gear 6 and the third gear 8 are caused to mesh with the first gear 1, and the gear member 7 is connected to the position adjustment member 11. Next, two spline members 23 and 24 loosely connected by use of the first bolt 27 are fitted around the connecting shaft portion 5a, and the spline teeth 23a and 24a of the spline members 23 and 24 are fitted into the spline grooves 13 of the connecting shaft portion 5a. Then, the sandwiching member 10 is fitted to the outside of the whirl-stop member 9 and is loosely connected to the gear member 7 with use of the third bolt 38. In this state, the plate cylinder drive unit 3 is being largely assembled.

In the plate cylinder drive unit 3 largely assembled as described above, with use of the eccentric shaft member 54 and a known hexagon wrench 55 both shown in FIG. 6, position adjustment in the circumferential direction and fixation of the two spline members 23 and 24 of the whirl-stop member 9 are performed.

The eccentric shaft member 54 includes a relatively long control shaft portion 54a and a relatively short eccentric shaft portion 54b having a smaller diameter than that of the control shaft portion 54a and eccentrically and integrally formed on a distal end surface (the rear end surface in use) thereof. In a base end portion (the front side in use) of the control shaft portion 54a, a radial through hole 56 is formed, and a control rod 57 is inserted through this hole 56. The outer diameter of the control shaft portion 54a is slightly smaller than the inner diameter of the position adjustment circular hole 28 of the second spline member 24. The outer diameter of the eccentric shaft portion 54b is slightly smaller than the circumferential width of the position adjustment elongated hole 29 of the first spline member 23. The length of the eccentric shaft portion 54b is approximately equal to the depth of the position adjustment elongated hole 29 of the first spline member 23, and the length from the distal end of the control shaft portion 54a to the hole 56 is greater than a thickness combining that of the second spline member 24 and that of the flange 10b of the sandwiching member 10.

As described above, because the second gear 6 meshes with the first gear 1 in the state where the plate cylinder drive unit 3 is largely assembled and the third bolts 38 connecting the sandwiching member 10 and the gear member 7 are loosened, the gear member 7 and the sandwiching member 10 are nonrotatable, but the plate cylinder drive shaft 5 and the whirl-stop member 9 are rotatable. In such a state, the plate cylinder drive shaft 5 is rotated to cause any one of the position adjustment circular holes 39 of the sandwiching member 10 to coincide with the position adjustment circular hole 28 of the second spline member 24. Then, the eccentric shaft portion 54a of the eccentric shaft member 54 is passed through the position adjustment circular hole 39 and the position adjustment circular hole 28 of the second spline member 24, and is fitted into the position adjustment elongated hole 29 of the first spline member 23. In this state, the control shaft portion 54a of the eccentric shaft member 54 is fitted into the circular holes 28 and 39 and the base end portion of the eccentric shaft portion 54 into which the control rod 57 is inserted projects outward beyond the sandwiching member 10. Then, with the control rod 57, which is held with a hand, the control shaft portion 54a is rotated clockwise or counterclockwise. In this state, because the eccentric shaft portion 54b of the eccentric shaft member 54 moves arcuately around the central axis of the control shaft portion 54a of the eccentric shaft member 54, the two spline members 23 and 24 circumferentially move relative to each other. When the spline teeth 23a and 24a of the spline members 23 and 24 are brought into pressure contact with the opposite side walls of the spline grooves 13 of the connecting shaft portion 5a by an appropriate force whereby backlash between the spline teeth 23a and 24a and the spline grooves 13 is eliminated, the eccentric shaft member 54 is fixed at that location. At this time, because the bolt tightening circular hole 40 of the sandwiching member 10 coincides with the bolt hole 26 of the second spline member 24, i.e., the first bolt 27 fixed into the bolt hole 26, the hexagon wrench 55 is inserted into the circular hole 40 to mesh with the head 27a of the bolt 27, whereby the bolt 27 is tightened. When all the bolts 27 are thus tightened, both spline members 23 and 24 are fixed with no backlash between the connecting shaft portion 5a and the spline members 23 and 24. As described above, in the state in which the sandwiching member 10 is loosely connected to the gear member 7 with use of the bolts 38, circumferential position adjustment of the two spline members 23 and 24 and fixation thereof are performed, which therefore eliminates the need to completely remove the sandwiching member 10 from the gear member 7 for the above-mentioned adjustment and fixation. The position adjustment of the two spline members 23 and 24 just has to be performed only one time initially, but may also be performed later in the same manner as describe above, as appropriate.

Once the position adjustment and fixation of the two spline members 23 and 24 are completed, the hexagon wrench 55 and the eccentric shaft member 54 are removed from the sandwiching member 10. Then, by rotating the plate cylinder drive shaft 5 with respect to the gear member 7, rotational phase of the first gear 1 and the plate cylinder drive shaft 5 is adjusted, and the bolts 38 are tightened to fix the sandwiching member 10 to the gear member 7 whereby whirl-stop member 9 is sandwiched and fixed between the sandwiching member 10 and the gear member 7. By this procedure, rough register is completed, which allows the gear member 7 and the plate cylinder drive shaft 5 to rotate integrally. The rough register also just has to be performed only one time initially, but may also be performed later as appropriate.

Although printing may be performed in a state where the above-mentioned rough register is completed, fine register may be performed by moving the position adjustment member 11 in the front-rear direction to move the gear member 7 in the front-rear direction. When the gear member 7 moves in the front-rear direction, the second gear 6 moves in the front-rear direction with respect to the first gear 1, and the first gear 1 and the second gear 6 move relatively due to the helix angle of the teeth 1a and 6a of the first gear 1 and the second gear 6, respectively. By this movement, rotational phase of the first gear 1 and the plate cylinder drive shaft 5 shifts, which allows fine register.

During printing, in the state in which the whirl-stop member 9 is fixed to the gear member 7 as describe above, rotation of the first gear 1 is transmitted via the second gear 6 to the gear member 7 and the plate cylinder drive shaft 5 whereby the plate cylinder 2 is rotated. At this time, because the second spring 46 biases the third gear 8 such that the third gear 8 rotates in the rotational direction with respect to the second gear 6, no backlash is formed between the first gear 1 and the second and third gears 6 and 8. Further, because the first spring 44 biases the third gear 8 toward the second gear 8 to bring the third gear 8 in pressure contact with one side of the second gear 6, the third gear 8 does not tilt. Furthermore, by adjusting the circumferential positions of the two spline members 23 and 24, backlash between the whirl-stop member 9 and the plate cylinder drive shaft 5 is eliminated. Therefore, the gear member 7 around which the second gear 6 is disposed rotates smoothly and rotational accuracy of the plate cylinder is high, which results in improved printing quality.

During printing, oil is supplied through two kinds of oil filler holes 21 and 22 of the gear member 7 to the inside of the gear member 7. The oil supplied through the first oil filler hole 21 enters the annular groove 15 of the boss 14, and then enters a slight clearance between the front and rear sliding contact portions 14a, 14b located frontward and rearward of the groove 15 and the connecting shaft portion 5a. The oil supplied through the second oil filler hole 22 enters a clearance between the rear sliding contact portion 14b of the annular groove 15 and the connecting shaft portion 5a. Therefore, thin oil film is formed between the inner circumferential surfaces of the sliding contact portions 14a, 14b of the boss 14 and the outer circumferential surface of the connecting shaft portion 5a, whereby centering of the gear member 7 with respect to the drive shaft 5 is performed.

Configurations of the printer and the plate cylinder drive unit 3 are not limited to those of the above-described embodiments and may be modified as appropriate.

INDUSTRIAL APPLICABILITY

The present invention is suitably applied to a plate cylinder drive unit in a printer. In particular, it is suitably applied to the plate cylinder drive unit in the printer that performs multi-color printing on an outer circumference surface of beverage cans. With the plate cylinder drive unit according to the present invention, backlash between a drive helical gear and a driven helical gear is eliminated and rotation of a driven gear member is facilitated whereby rotational accuracy of a plate cylinder is increased, which results in improved printing quality.

DESCRIPTION OF REFERENCE NUMERALS

1: drive helical gear (main gear)
2: plate cylinder
3: plate cylinder drive unit
4: frame
5: plate cylinder drive shaft
6: driven helical gear
7: driven gear member
8: backlash eliminating helical gear
9: whirl-stop member
10: member for sandwiching whirl-stop member
10a: cylinder portion
10b: flange portion 11: position adjustment member for driven gear member
13: spline groove
23: first spline member
23a: spline tooth
24: second spline member
24a: spline tooth
25: screw hole
26: bolt hole (screw penetrating hole)
27: hexagon socket head bolt (screw member)
28: circular hole
29: elongated hole
38: bolt (screw member)
39: through hole for adjusting spline member
40: through hole for bolt tightening
44: first coil spring (elastic member)
46: second coil spring (elastic member)

The invention claimed is:

1. A plate cylinder drive unit in a printer which rotatably drives a plate cylinder by transmitting rotation of a drive helical gear to a plate cylinder comprising:
   a plate cylinder drive shaft rotatably supported on a frame of the printer and connected to the plate cylinder to rotate integrally with the plate cylinder;
   a driven gear member having a driven helical gear that meshes with the drive helical gear and attached around the plate cylinder drive shaft in such a manner that the driven gear member is rotatable and axially movable with respect to the plate cylinder drive shaft;
   register means for axially moving the driven gear member with respect to the plate cylinder drive shaft and fixing the driven gear member at a predetermined position;
   a whirl-stop member attached to the plate cylinder drive shaft in such a manner that the whirl-stop member is nonrotatable but axially movable with respect to the plate cylinder drive shaft;
   whirl-stop-member fixation means for removably fixing the whirl-stop member to the driven gear member;
   a backlash eliminating helical gear disposed on one side of the driven helical gear in such a manner that the backlash eliminating helical gear is rotatable and axially movable within a predetermined range with respect to the driven helical gear;
   a first elastic member biasing the backlash eliminating helical gear toward the driven helical gear to bring the backlash eliminating helical gear in pressure contact with the one side of the driven helical gear; and
   a second elastic member biasing the backlash eliminating helical gear in such a manner that the backlash eliminating helical gear rotates in a predetermined direction with respect to the driven helical gear.

2. The plate cylinder drive unit in the printer according to claim 1, wherein the whirl-stop-member fixation means comprises a sandwiching member sandwiching the whirl-stop member between the whirl-stop-member fixation means and the driven gear member, and a screw member fixing the sandwiching member to the driven gear member to sandwich the whirl-stop member between the sandwiching member and the driven gear member, the sandwiching member comprises a cylinder portion located around the whirl-stop member and a flange portion integrally formed with the cylinder portion at one end thereof and sandwiching the whirl-stop member between the driven gear member and the flange portion, and the cylinder portion of the sandwiching member is fixed to the driven gear member by means of the screw member.

3. The plate cylinder drive unit in the printer according to claim 2, wherein the whirl-stop member comprises two annular spline members stacked and fixed to each other so as to allow adjustment of relative positions of the spline members in a circumferential direction, and each spline member has, on an inner circumference thereof, spline teeth that fit into spline grooves formed on an outer circumference of the plate cylinder drive shaft.

4. The plate cylinder drive unit in the printer according to claim 3, wherein a first spline member has a plurality of screw holes into which a plurality of screw members are screwed, a second spline member has a plurality of screw penetrating holes whose inner diameter is greater than an outer diameter of an external thread portion of the screw member, and the screw members are inserted through the corresponding screw penetrating holes and screwed into the corresponding screw holes, respectively, to fix the two spline members to each other.

5. The plate cylinder drive unit in the printer according to claim 4, wherein the second spline member has a position adjustment circular hole which penetrates the second spline member in an axial direction, and the first spline member has, on a surface thereof facing the circular hole, an position adjustment elongated hole whose circumferential width is smaller than an inner diameter of the circular hole and whose radial length is greater than the circumferential width of the elongated hole.

6. The plate cylinder drive unit in the printer according to claim 5, wherein a screw member for fixing the two spline members of the whirl-stop member is a hexagon socket head bolt, and the flange portion of the sandwiching member includes at least one position adjustment circular hole, as a through hole, which corresponds to the position adjustment circular hole of the second spline member, and a plurality of bolt tightening circular holes, as through holes, which correspond to the plurality of screw penetrating holes of the second spline member when the position adjustment circular hole of the flange portion of the sandwiching member coincides with the position adjustment circular hole of the second spline member.

7. The plate cylinder drive unit in the printer according to claim 1, wherein the whirl-stop member comprises two annular spline members stacked and fixed to each other so as to allow adjustment of relative positions of the spline members in a circumferential direction, and each spline member has, on an inner circumference thereof, spline teeth that fit into spline grooves formed on an outer circumference of the plate cylinder drive shaft.

8. The plate cylinder drive unit in the printer according to claim 7, wherein a first spline member has a plurality of screw holes into which a plurality of screw members are screwed, a second spline member has a plurality of screw penetrating holes whose inner diameter is greater than an outer diameter of an external thread portion of the screw member, and the screw members are inserted through the corresponding screw penetrating holes and screwed into the corresponding screw holes, respectively, to fix the two spline members to each other.

9. The plate cylinder drive unit in the printer according to claim 8, wherein the second spline member has a position adjustment circular hole which penetrates the second spline member in an axial direction, and the first spline member has, on a surface thereof facing the circular hole, an position adjustment elongated hole whose circumferential width is smaller than an inner diameter of the circular hole and whose radial length is greater than the circumferential width of the elongated hole.

10. The plate cylinder drive unit in the printer according to claim 9, wherein a screw member for fixing the two spline members of the whirl-stop member is a hexagon socket head bolt, and the flange portion of the sandwiching member includes at least one position adjustment circular hole, as a through hole, which corresponds to the position adjustment circular hole of the second spline member, and a plurality of bolt tightening circular holes, as through holes, which correspond to the plurality of screw penetrating holes of the second spline member when the position adjustment circular hole of the flange portion of the sandwiching member coincides with the position adjustment circular hole of the second spline member.

* * * * *